(12) United States Patent  (10) Patent No.: US 12,182,461 B2
Kitahashi et al.  (45) Date of Patent: Dec. 31, 2024

(54) SERVER SYSTEM TRANSMITTING REFLECTING INSTRUCTION TO REFLECT USABLE PRINT QUANTITY TO PRINTER

(71) Applicant: Brother Kogyo Kabushiki Kaisha, Nagoya (JP)

(72) Inventors: Yuki Kitahashi, Setagaya (JP); Shunsuke Minamikawa, Nagoya (JP); Taichiro Kimoto, Nagoya (JP); Yushi Deura, Nagoya (JP); Ayaka Hotta, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 18/180,363

(22) Filed: Mar. 8, 2023

(65) Prior Publication Data

US 2023/0289117 A1  Sep. 14, 2023

(30) Foreign Application Priority Data

Mar. 14, 2022  (JP) ................................ 2022-039657

(51) Int. Cl.
*G06F 3/12*  (2006.01)
*H04N 1/00*  (2006.01)
*H04N 1/34*  (2006.01)

(52) U.S. Cl.
CPC ............ *G06F 3/1236* (2013.01); *G06F 3/121* (2013.01); *G06F 3/1229* (2013.01); *G06F 3/1285* (2013.01); *H04N 1/00344* (2013.01); *H04N 1/346* (2013.01)

(58) Field of Classification Search
CPC ............................................... G06F 3/12–1285
See application file for complete search history.

(56) References Cited

U.S. PATENT DOCUMENTS

| | | | |
|---|---|---|---|
| 9,288,826 B2* | 3/2016 | Shibata | H04N 1/00307 |
| 2002/0077979 A1* | 6/2002 | Nagata | G06Q 10/06 705/40 |
| 2004/0243994 A1* | 12/2004 | Nasu | G06F 8/65 717/171 |

(Continued)

FOREIGN PATENT DOCUMENTS

JP   2021-018621 A   2/2021

*Primary Examiner* — Barbara D Reinier
(74) *Attorney, Agent, or Firm* — Merchant & Gould P.C.

(57) ABSTRACT

In a server system, the computer stores in the printer a usable print quantity in association with a printer in response to an increase request from an external device. The increase request is a request to store an increased quantity as the usable print quantity. The usable print quantity indicates one of the number of sheets and an amount of colorant which are usable for printing in the printer. The computer determines, after a communication interface is disconnected from the printer, whether a reconnection is established between the communication interface and the printer. The computer determines, when the reconnection is determined to be established, whether the usable print quantity has been reflected in data in the printer. The computer sends to the printer, when the usable print quantity is determined not to have been reflected in any data in the printer, a reflecting instruction to reflect the usable print quantity.

10 Claims, 7 Drawing Sheets

(56) References Cited

U.S. PATENT DOCUMENTS

2005/0275868 A1* 12/2005 Higashiura ............ G06K 15/00
                                                    358/1.14
2018/0039454 A1*  2/2018 Saito .................... G06F 3/1207
2022/0137891 A1   5/2022 Kawaguchi et al.

* cited by examiner

| | |
|---|---|
| CUMULATIVE PURCHASED SHEET COUNT D11 | 1000 |
| CUMULATIVE PRINTED SHEET COUNT D12 | 943 |

FIG. 2B

| USER IDENTIFIER UID | PRINTER IDENTIFIER PID |
|---|---|
| U0123456 | P9876543 |
| U0123457 | P9876544 |
| ⋮ | ⋮ |

FIG. 2C

| | |
|---|---|
| CUMULATIVE PURCHASED SHEET COUNT D51 | 1000 |
| REFLECTED CUMULATIVE PURCHASED SHEET COUNT D52 | 1000 |
| ADDITIONAL PURCHASE TIMESTAMP D53 | 2021/08/01 14:00 |
| ADDITIONAL PURCHASE REFLECTED TIMESTAMP D54 | 2021/08/01 14:02 |
| CUMULATIVE PRINTED SHEET COUNT D55 | 943 |

| PRINTER IDENTIFIER PID | ONLINE FLAG |
|---|---|
| P9876543 | 1 |
| P9876544 | 0 |
| ⋮ | ⋮ |

SERVER SYSTEM TRANSMITTING REFLECTING INSTRUCTION TO REFLECT USABLE PRINT QUANTITY TO PRINTER

REFERENCE TO RELATED APPLICATIONS

This application claims priority from Japanese Patent Application No. 2022-039657 filed on Mar. 14, 2022. The entire content of the priority application is incorporated herein by reference.

BACKGROUND ART

There is a conventional technology for a printing service in which the users of printers pay a fee based on their printing needs. In such a service, a server stores a permitted printing quantity purchased by the user in advance, and the user can use the printer to print within the range of this permitted printing quantity.

DESCRIPTION

When data specifying printing-related information, such as the number of sheets that can be printed, is updated on the server in this conventional technology, this updated content is not easily reflected on the printer side and, hence, the conventional technology has room for improvement.

In view of the foregoing, it is an object of the present disclosure to provide a server system and an information processing program that can reflect the content of printing-related information on a printer when the content has been updated on a server.

In view of the foregoing, it is an object of the present disclosure to provide an image forming apparatus a server system. The server system includes a communication interface, a storage, and a computer. The communication interface is connectable to an external device and a printer. The computer is configured to perform: storing in the printer a usable print quantity in association with the printer in response to an increase request from the external device via the communication interface, the increase request being a request to store an increased quantity as the usable print quantity, the usable print quantity indicating one of the number of sheets and an amount of colorant which are usable for printing in the printer; determining, after the communication interface is disconnected from the printer, whether a reconnection is established between the communication interface and the printer; determining, when the reconnection is determined to be established, whether the usable print quantity stored in association with the printer has been reflected in data in the printer; and sending to the printer, when the usable print quantity is determined not to have been reflected in any data in the printer, a reflecting instruction to reflect the usable print quantity.

In order to attain the above and other object, the present disclosure provides a non-transitory computer readable storage medium storing a set of program instructions installed on and executed by a computer included in a server system. The server system further includes a communication interface connectable to an external device and a printer and a storage. The set of program instructions includes: storing in the printer a usable print quantity in association with the printer in response to an increase request from the external device via the communication interface, the increase request being a request to store an increased quantity as the usable print quantity, the usable print quantity indicating one of the number of sheets and an amount of colorant which are usable for printing in the printer; determining, after the communication interface is disconnected from the printer, whether a reconnection is established between the communication interface and the printer; determining, when the reconnection is determined to be established, whether the usable print quantity stored in association with the printer has been reflected in data in the printer; and sending to the printer, when the usable print quantity is determined not to have been reflected in any data in the printer, a reflecting instruction to reflect the usable print quantity.

In the above structure, in a case that the usable print quantity is updated, the usable print quantity can be promptly reflected in data in the printer.

An embodiment of the present disclosure will be described while referring to accompanied drawings.

System Configuration

Figure 1:
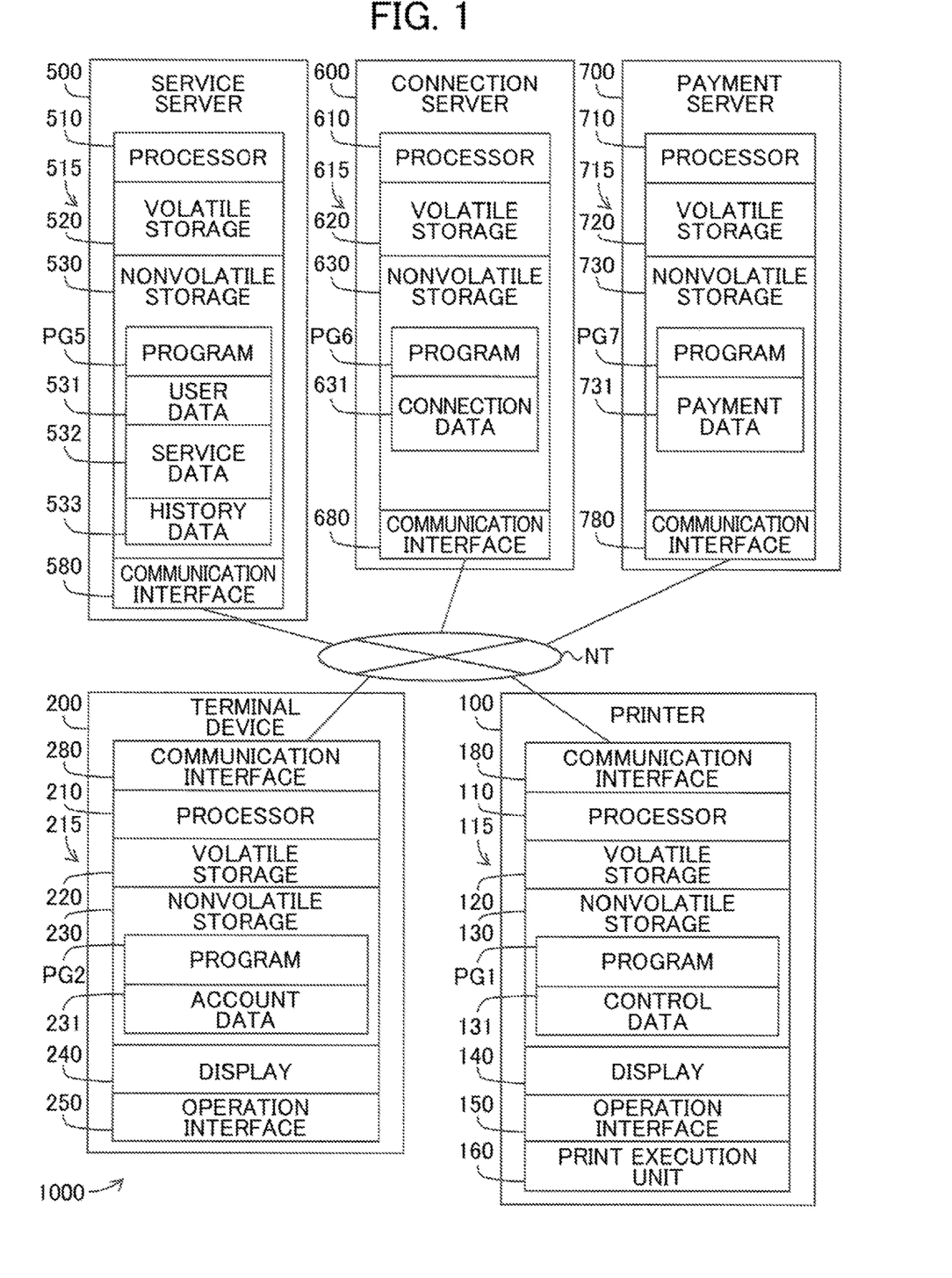
FIG. 1 is a block diagram illustrating configurations of a printing management system that includes a server system.

FIG. 1 shows an example of a printing management system 1000 that includes the server system of the present embodiment. The printing management system 1000 includes a printer 100, a terminal device 200, a service server 500, a connection server 600, and a payment server 700. The terminal device 200 is an example of the external device. The combination of the service server 500 and the connection server 600 is an example of the server system.

In the present embodiment, a printing service provider provides the service server 500 and the connection server 600, and a payment service provider provides the payment server 700. The printing service provider also provides printers 100 to users who have subscribed for printing services. The service server 500 allocates a printable sheet count to the printer 100. The service server 500 is an example of the second server. The printer 100 allows the user to print up to the number of sheets specified by the printable sheet count.

The user can also purchase an additional number of printable sheets for a fee. When a user purchases additional printable sheets, the service server 500 updates the printable sheet count for the printer 100 by adding the number of newly purchased sheets to the current printable sheet count for the printer 100. The payment server 700 processes payments for the purchases of printable sheets.

The connection server 600 establishes a persistent connection with the printer 100. Any of various methods may be used for maintaining this persistent connection. For example, the connection server 600 and the printer 100 may establish a communication session for a persistent connection according to the Extensible Messaging and Presence Protocol (XMPP). The connection server 600 is an example of the first server.

The connection server 600 and the printer 100 maintain this persistent connection through periodic keep-alive messaging. The printer 100 and the service server 500 communicate with each other via the connection server 600. Each of the devices 100, 200, 500, 600, and 700 is connected to a network NT. The network NT may include the Internet. The network NT may also include a local network.

Printer

The printer 100 has a processor 110, a storage 115, a display 140, an operation interface (input interface) 150, a print execution unit (print engine, printing mechanism) 160, and a communication interface (inter-device interface, communication member, connection member, data-transferring member, data-exchange member, or network interface) 180. Each of these components is interconnected via a bus. The storage 115 also includes a volatile storage 120, and a nonvolatile storage 130. The processor 110 is a device that performs data processing, such as a CPU. The volatile storage 120 is DRAM, for example. The nonvolatile storage 130 is flash memory, for example.

The display 140 is a device that displays images, such as a liquid crystal display (LCD), an organic light-emitting diode (OLED) display, or a light-emitting diode (LED) display. The operation interface 150 is a device that receives operations from the user and may include buttons, levers, and a touchscreen superposed over the display 140. The communication interface 180 functions to communicate with other devices. For example, the communication interface 180 may include one or more of a USB interface, a wired LAN interface, and a wireless communication interface conforming to the IEEE 802.11 standard. In the present embodiment, the communication interface 180 is connected to the network NT.

The print execution unit 160 is a device that uses colorant to print images on sheets of paper or the like according to prescribed methods, such as a laser method or an inkjet method. The colorant is toner or ink, for example.

The nonvolatile storage 130 stores a program PG1, and control data 131. The program PG1 is stored in the nonvolatile storage 130 in advance as firmware by the manufacturer of the printer 100. By executing the program PG1, the processor 110 executes various processes described later. The control data 131 will also be described later in detail.

Terminal Device 200

The terminal device 200 has a processor 210, a storage 215, a display 240, an operation interface (input interface) 250, and a communication interface (inter-device interface, communication member, connection member, data-transferring member, data-exchange member, or network interface) 280. All of these components are interconnected via a bus. The storage 215 also includes a volatile storage 220, and a nonvolatile storage 230. The processor 210 is a device that performs data processing, such as a CPU. The volatile storage 220 is DRAM, for example. The nonvolatile storage 230 is flash memory, for example.

The display 240 is a device that displays images, such as an LCD, an OLED display, or an LED display. The operation interface 250 is a device that receives operations from the user and may include buttons, levers, and a touchscreen superposed over the display 240. The communication interface 280 functions to communicate with other devices. For example, the communication interface 280 may include one or more of a USB interface, a wired LAN interface, and a wireless communication interface conforming to the IEEE 802.11 standard. In the present embodiment, the communication interface 280 is connected to the network NT.

The nonvolatile storage 230 stores a program PG2 and account data 231. Although not shown in the drawings, an operating system is running on the terminal device 200. The operating system is one of Android (registered trademark) or iOS (registered trademark), for example. Various applications can also run on the operating system.

The program PG2 is application that runs on the operating system. As an alternative, the program PG2 may be an application that runs within another application. Such programs are referred to as mini programs. The program PG2 is downloaded to the terminal device 200 from a server (not shown). As an alternative, the program PG2 may be stored on a portable storage, such as a CD-ROM or a USB flash drive, and provided in this form. By executing the program PG2, the processor 210 implements various processes described later. The account data 231 will also be described later in detail.

Servers

The servers 500, 600, and 700 have respective processors 510, 610, and 710; storages 515, 615, and 715; and communication interfaces 580, 680, and 780. All of their respective components are interconnected via a respective bus for each of the servers 500, 600, and 700. The storages 515, 615, and 715 also include respective volatile storages 520, 620, and 720; and nonvolatile storages 530, 630, and 730. The processors 510 and 610 are examples of the processor, the controller, the arithmetic equipment, and the computer. The communication interfaces 580 and 680 are examples of the communication interface (inter-device interface). The volatile storages 520 and 620 and the nonvolatile storages 530 and 630 are examples of the storage.

The processors 510, 610, and 710 are devices that perform data processing, such as CPUs. The volatile storages 520, 620, and 720 are DRAM, for example, while the nonvolatile storages 530, 630, and 730 are flash memory, for example. The communication interfaces 580, 680, and 780 function to communicate with other devices. For example, each of the communication interfaces (inter-device interfaces, communication members, connection members, data-transferring members, data-exchange members, or network interfaces) 580, 680, and 780 includes one or more of a USB interface, a wired LAN interface, and a wireless communication interface conforming to the IEEE 802.11 standard. In the present embodiment, each of the communication interfaces 580, 680, and 780 is connected to the network NT.

Programs PG5, PG6, and PG7 are stored in the respective nonvolatile storages 530, 630, and 730 in advance for controlling operations of the corresponding servers 500, 600, and 700. The processors 510, 610, and 710 implement various processes described later in FIGS. 3 through 7 according to the programs PG5, PG6, and PG7, respectively. The programs PG5 and PG5 for the servers 500 and 600 respectively, are examples of the information processing program.

The nonvolatile storage 530 in the service server 500 also stores user data 531, service data 532, and history data 533. The nonvolatile storage 630 in the connection server 600 also stores connection data 631. The nonvolatile storage 730 in the payment server 700 also stores payment data 731. The various types of data will be described later in detail.

Although not shown in the drawings, a server operating system runs on each of the servers 500, 600, and 700. The programs PG5, PG6, and PG7 are applications that run on these operating systems. As an alternative, the programs PG5, PG6, and PG7 may be programs embedded in the operating systems themselves.

Control Data

Figure 2A:
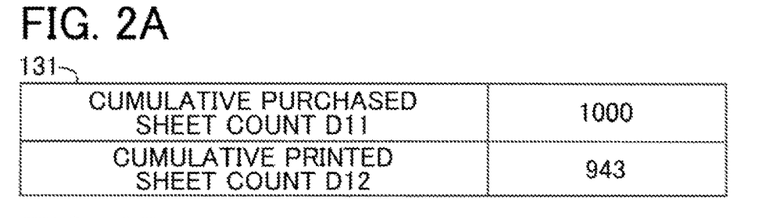
FIG. 2A is an explanatory diagram illustrating control data stored in a printer.

FIG. 2A shows an example of the control data 131 stored in the nonvolatile storage 130 of the printer 100 shown in FIG. 1. The control data 131 shows the cumulative purchased sheet count D11, and the cumulative printed sheet count D12. Hereinafter, the cumulative purchased sheet count D11 will simply be called the cumulative purchased count D11, and the cumulative printed sheet count D12 will simply be called the cumulative print count D12.

The cumulative purchased count D11 is the cumulative number of printable sheets allocated to the printer 100. The purchased count denotes the number of printable sheets allocated to the printer 100. The cumulative print count D12 is the cumulative number of sheets that have been printed by the printer 100.

As will be described later in detail, the processor 110 of the printer 100 updates the cumulative purchased count D11 according to an instruction from the service server 500 and updates the cumulative print count D12 when a print is executed. The printer 100 is requested to print various numbers NP of sheets (where NP is an integer of 1 or greater). The processor 110 executes a print when the value NP+D12 is no greater than the value D11.

User Data

Figure 2B:
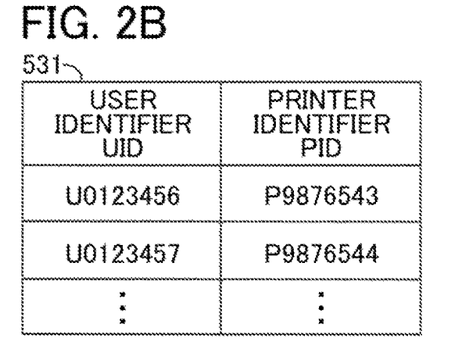
FIG. 2B is an explanatory diagram illustrating user data stored in a service server.

FIG. 2B shows an example of the user data 531 stored in the nonvolatile storage 530 of the service server 500 shown in FIG. 1. The user data 531 shows correlations between user identifiers UID and printer identifiers PID. Each user identifier UID identifies a user of a printer, such as the user of the printer 100. Each printer identifier PID identifies a printer, such as the printer 100. A correlation between a user identifier UID and a printer identifier PID is registered in the user data 531 whenever a user subscribes for a printing service offered by the printing service provider. As will be described later, management of printable sheet counts (e.g., purchases) is performed in association with the user identifiers UID.

Service Data

Figure 2C:
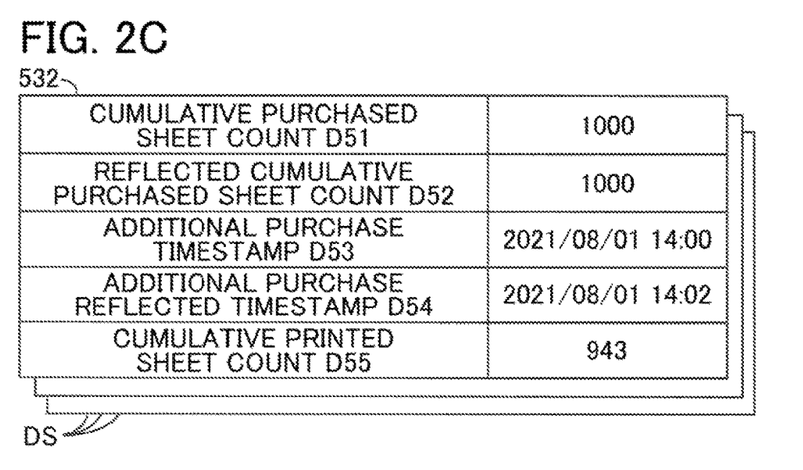
FIG. 2C is an explanatory diagram illustrating service data stored in the service server.

FIG. 2C shows an example of the service data 532 stored in the nonvolatile storage 530 of the service server 500 shown in FIG. 1. The service data 532 shows a cumulative purchased sheet count D51, a reflected cumulative purchased sheet count D52, an additional purchase timestamp D53, an additional purchase reflected timestamp D54, and a cumulative printed sheet count D55. Hereinafter, the cumulative purchased sheet count D51 will simply be called the cumulative purchased count D51, the reflected cumulative purchased sheet count D52 will simply be called the reflected cumulative purchased count D52, and the cumulative printed sheet count D55 will simply be called the cumulative print count D55. The cumulative purchased sheet count D51 is an example of the first cumulative value and an example of the printable amount. The reflected cumulative purchased count D52 is an example of the second cumulative value.

One dataset DS containing the five data parameters D51-D55 denotes a dataset associated with a single printer identifier PID. The service data 532 includes a plurality of datasets DS for a plurality of printer identifiers PID.

The cumulative purchased count D51 is the cumulative number of purchased sheets that increases through the purchase of printable sheets. As will be described later, the processor 510 of the service server 500 updates the cumulative purchased count D51 on the basis of the purchase of printable sheets. After updating the cumulative purchased count D51, the processor 510 transmits an instruction to the printer 100 to update the cumulative purchased count D11 shown in FIG. 2A. In response to the updating instruction, the processor 110 of the printer 100 updates the cumulative purchased count D11 to the same value as the cumulative purchased count D51.

The reflected cumulative purchased count D52 is the cumulative number of purchased sheets that have been reflected in the cumulative purchased count D11 of the control data 131 stored on the printer 100, as shown in FIG. 2A. As will be described later, the processor 110 of the printer 100 notifies the service server 500 of the results of updating the cumulative purchased count D11. When the notification indicates that the update was successful, the processor 510 of the service server 500 updates the reflected cumulative purchased count D52 to the same value as the cumulative purchased count D11. Hence, D52=D11=D51 at this time. While the cumulative purchased count D11 stored on the printer 100 has not been updated, the reflected cumulative purchased count D52 may differ from the cumulative purchased count D51.

The additional purchase timestamp D53 indicates the date and time at which the cumulative purchased count D51 was updated. The additional purchase reflected timestamp D54 indicates the date and time at which the reflected cumulative purchased count D52 was updated. The processor 510 can reference a timer (not shown) provided in the service server 500 to acquire the current date and time.

The cumulative print count D55 is the cumulative number of sheets that have been printed by the printer 100. As will be described later, the processor 110 of the printer 100 requests the service server 500 to update the cumulative print count D55 when a print is executed. In response to this request, the processor 510 of the service server 500 updates the cumulative print count D55 to the same value as the cumulative print count D12.

Connection Data

Figure 2D:
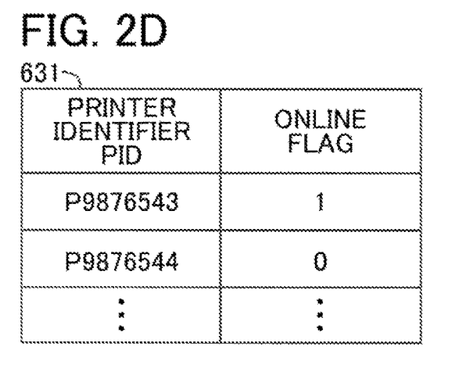
FIG. 2D is an explanatory diagram illustrating connection data stored in a connection server.

FIG. 2D shows an example of the connection data 631 stored in the nonvolatile storage 630 of the connection server 600 shown in FIG. 1. The connection data 631 shows correlations between printer identifiers PID and the values of online flags. Each value of the online flags is set to 0 or 1. While the online flags will be described later in greater detail, a flag value of "1" indicates that the corresponding printer 100 is in a connected state with the connection server 600 (an online state), and a flag value of "0" indicates that the printer 100 is not connected to the connection server 600 (an offline state or disconnected state). When the value "1" is stored in the online flag corresponding to the printer identified PID, connection data 631 also stores, associated with the printer identifier PID, information such as IP addresses indicating the network locations of printers connected to the connection server 600 through persistent connections. The online flag is an example of the status indicator.

Printing Process

Figure 3:
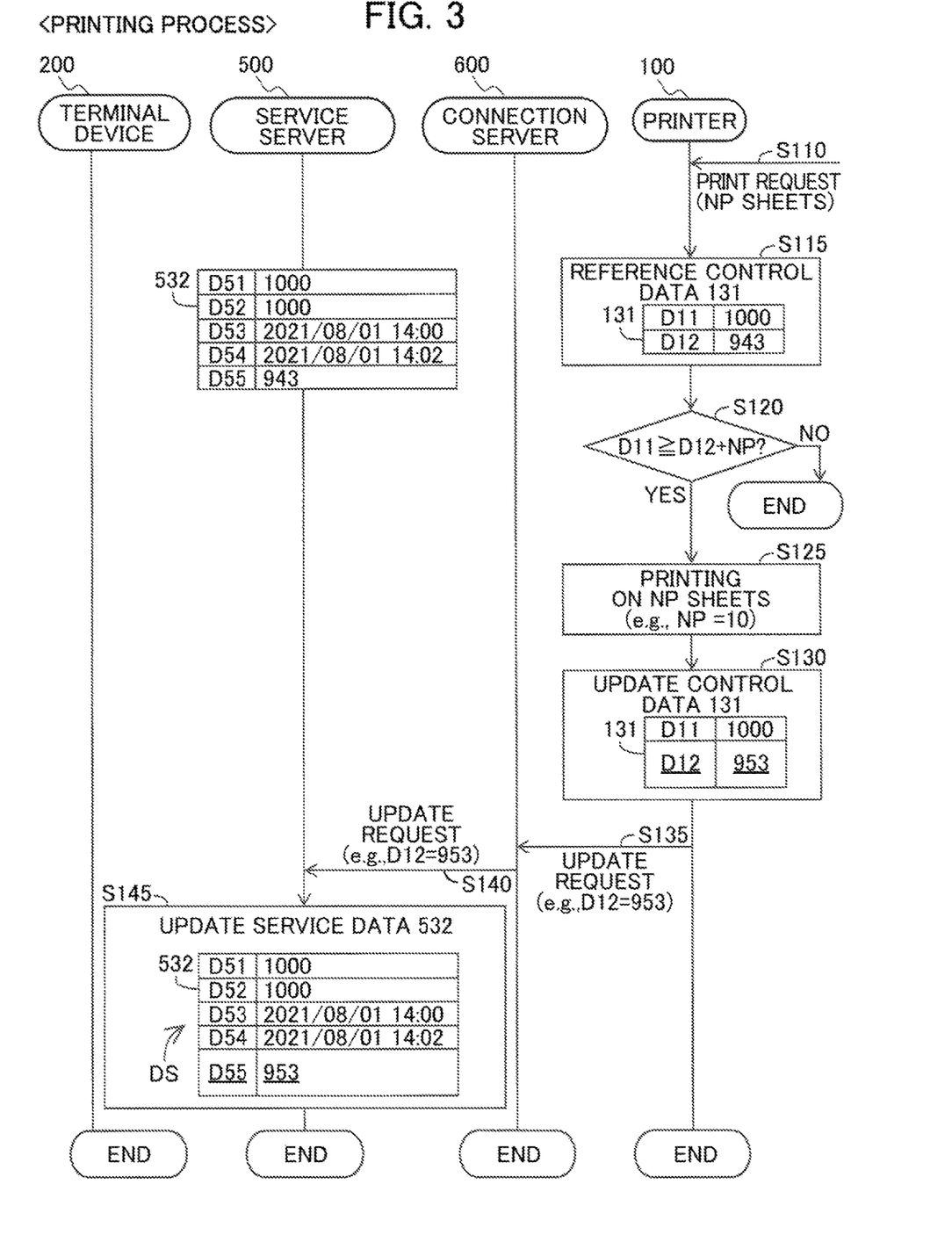
FIG. 3 is a sequence chart illustrating a printing process.

FIG. 3 is a sequence chart showing an example of a printing process when the printer 100 is executing a print. The top portion of the drawing shows examples of the service data 532 and control data 131 prior to printing. At the time that the process of FIG. 3 starts, the counts D51, D52, D11, and D12 satisfies the following relations in this case, D51=D52=D11=1000, and D55=D12=943.

In S110 of FIG. 3, the printer 100 receives a print request from the terminal device 200, for example. However, the source of the print request may be any device that can communicate with the printer 100 and is not limited to the terminal device 200. When the communication interface 180 of the printer 100 includes a USB interface, for example, the source of the print request may be an external device, such as a personal computer that is connected to the USB interface by a cable. In a case that the communication interface 180 includes a wireless communication interface conforming to the IEEE 802.11 standard, the source of the print request may be an external device connected wirelessly to the wireless communication interface, such as a smartphone or a tablet computer. The printer 100 may also receive a print request from the service server 500. For example, the service server 500 may transmit a print request to the printer 100 in response to an instruction from a user device, such as the terminal device 200.

The print request can include various data. In the present embodiment, a print request includes image data for an image to be printed (hereinafter referred to as "target image data"). Target image data may have any of various data formats. For example, the target image data may be image data in a bitmap data format such as the Joint Photographic Experts Group (JPEG) or Portable Network Graphics (PNG) format or image data described with a page description language such as the Portable Document Format (PDF) or the XML Paper Specification (XPS). Hereinafter, the target image data will be assumed to represent NP images to be printed on NP sheets (where NP is an integer of 1 or greater). The number NP will be called the sheet count NP.

In S115 the processor 110 references the control data 131 shown in FIG. 2A to acquire the cumulative purchased count D11 and the cumulative print count D12.

In S120 the processor 110 determines whether the sum of the cumulative print count D12 and the sheet count NP is less than or equal to the cumulative purchased count D11. Satisfying the relation D11<D12+NP (S120: NO) indicates that the cumulative print count D12 will exceed the cumulative purchased count D11 after printing NP sheets will be performed. When the relation D11<D12+NP (S120: NO) is satisfied, the processor 110 ends the process without executing the print. At this time, the processor 110 may perform a process to notify the user that the print was not executed. For example, the processor 110 may display information on the display 140 indicating that the cumulative purchased count D11 is insufficient.

When D12+NP is no greater than D11 (S120: YES), in S125 the processor 110 controls the print execution unit 160 to execute printing on NP sheets by using the target image data. For example, the processor 110 generates print data from the target image data and supplies this print data to the print execution unit 160. The print execution unit 160 executes printing by using the print data. The print data may have any data format suited to the print execution unit 160. Alternatively, the processor 110 may supply the target image data as is to the print execution unit 160. In other words, the print execution unit 160 may be configured to print images by using the target image data.

Thus, printing is allowed when the sheet count NP is less than or equal to the value (D11−D12). Here, the difference between the cumulative purchased count D11 and the cumulative print count D12, i.e., (D11−D12) indicates the number of sheets that can be printed.

In S130 the processor 110 updates the control data 131. Specifically, the processor 110 increments the cumulative print count D12 by the sheet count NP. For example, in a case that the cumulative print count D12 prior to the update is 943 and the sheet count NP is 10, the cumulative print count D12 after the update is 953 (=943+10).

In S135 the processor 110 transmits an update request addressed to the service server 500 to the connection server 600. The update request includes data specifying the printer identifier PID associated with the printer 100 and data specifying the updated cumulative print count D12.

In S140 the processor 610 of the connection server 600 relays the update request received from the printer 100 to the service server 500.

In S145 the processor 510 of the service server 500 updates the service data 532 according to the update request. In the present embodiment, the processor 510 sets the cumulative print count D55 in the dataset DS associated with the printer identifier PID indicated in the update request to the same value as the cumulative print count D12 specified in the update request. For example, in a case of D12=953, the processor 510 sets the cumulative print count D55 to 953. Subsequently, the process of FIG. 3 ends.

Purchasing Process

Figure 4:
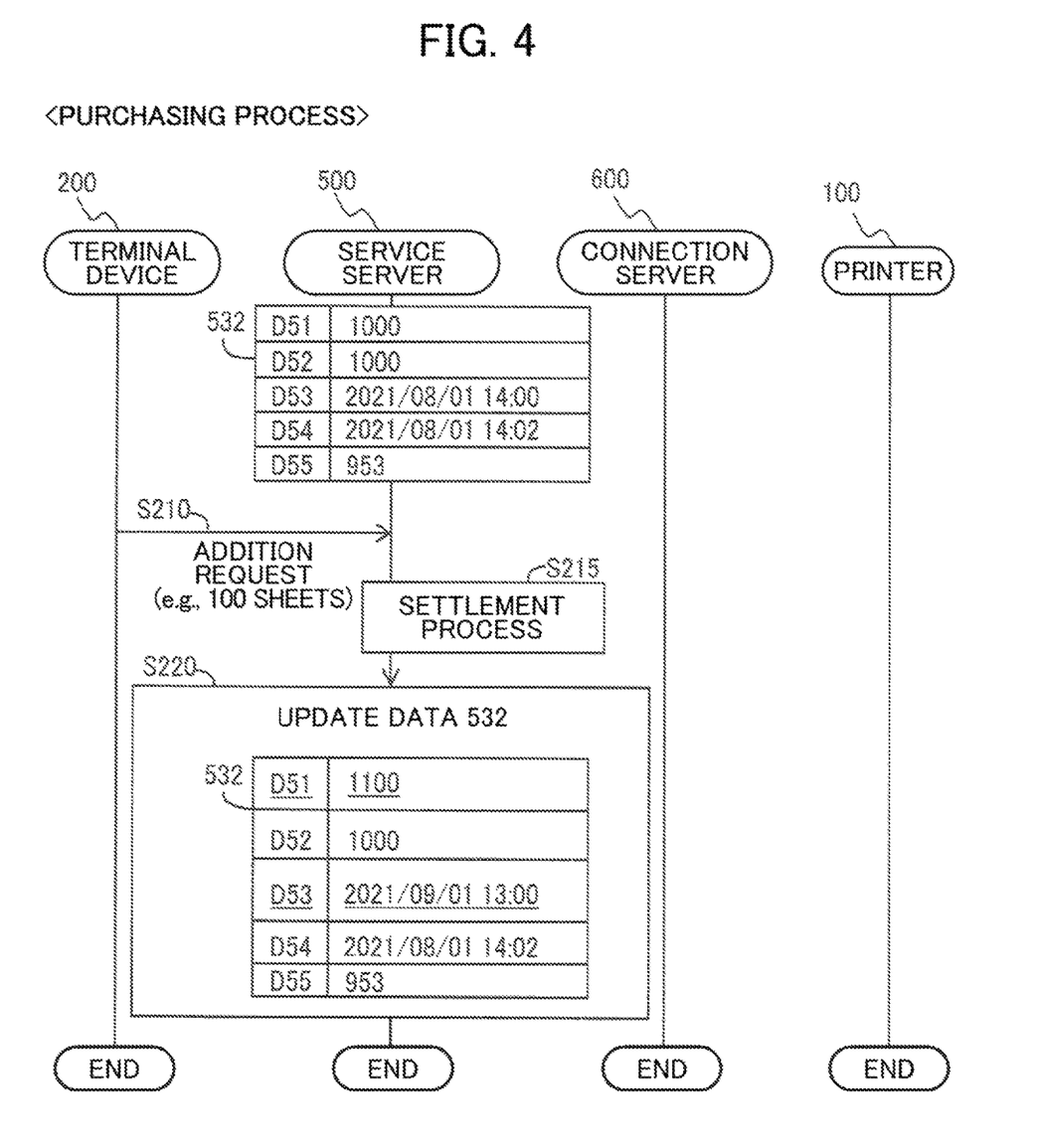
FIG. 4 is a sequence chart illustrating a purchasing process for purchasing printable sheets.

FIG. 4 is a sequence chart showing an example of a purchasing process for purchasing printable sheets. In this embodiment, printable sheets can be purchased for each of a plurality of printers. The following description is an example of printable sheets being purchased for the printer 100. The top portion of FIG. 4 shows an example of the service data 532 in the service server 500 prior to the purchase. Here, D51=D52=1000.

In S210 the user inputs a purchasing instruction specifying the number of sheets to be purchased through operations on the operation interface 250 of the terminal device 200. In response to the purchasing instruction, the processor 210 of the terminal device 200 transmits an addition request to the service server 500 for adding the number of purchased sheets. The addition request includes data specifying the user identifier UID of the user, data specifying the printer identifier PID of the printer, and data specifying the number of sheets to be purchased. In this specification, the number of printable sheets that the user has requested to be added for a fee, i.e., has purchased, will be called the "purchased sheet count." The addition request is an example of the increase request to store an increased quantity as the usable print quantity such as the number of purchased sheets and the cumulative print count D52.

In the present embodiment, the user has inputted the user identifier UID and the printer identifier PID into the terminal device 200 in advance. The account data 231 stored on the terminal device 200 specifies the inputted identifiers UID and PID. The processor 210 can reference the account data 231 to acquire the identifiers UID and PID. As an alternative, the user may input a purchasing instruction including information specifying one or both of the user identifier UID and printer identifier PID. The following description will assume that the printer identifier PID indicates the printer 100.

In S215 the processor 510 of the service server 500 executes a settlement process to settle payment for the addition request received from the terminal device 200 by communicating with the payment server 700. The settlement process is executed based on the user identifier UID and the number of purchased sheets specified in the addition request. In the settlement process, the user corresponding to the user identifier UID pays the printing service provider an amount for the number of purchased sheets. The settlement process may be implemented in any of various methods suitable for the payment server 700. For example, the processor 510 of the service server 500 may transmit a payment request to the payment server 700. The payment request includes the user identifier UID and data specifying the fee for the number of purchased sheets. The processor 710 of the payment server 700 executes a payment process on the basis of the payment request. The payment data 731 stored on the payment server 700 includes information used for the payment process, such as correlations between user identifiers UID and bank transfer accounts. Note that the processor 510 of the service server 500 may work with the terminal device 200 as well as the payment server 700 to implement the settlement process.

In S220 the processor 510 of the service server 500 updates the dataset DS associated with the printer identifier PID within the service data 532 shown in FIG. 2C and stores the updated dataset DS in the nonvolatile storage 530. This process of S220 is an example of the storing process. Specifically, the processor 510 increments the cumulative purchased count D51 by the purchased sheet count. In the example of FIG. 4, the cumulative purchased count D51 is 1000 prior to the update, and the purchased sheet count is 100. Thus, the updated cumulative purchased count D51 becomes 1100 (=1000+100) in this case. The processor 510 also updates the additional purchase timestamp D53 to the current date and time. Subsequently, the purchasing process ends.

In this way, the cumulative purchased count D51 is increased through the purchasing process. The reflected cumulative purchased count D52 is updated through a reflecting process described below. Following the purchasing process, the cumulative purchased count D51 differs from the reflected cumulative purchased count D52 until the reflected cumulative purchased count D52 is updated.

Reflecting Process

Figure 5:
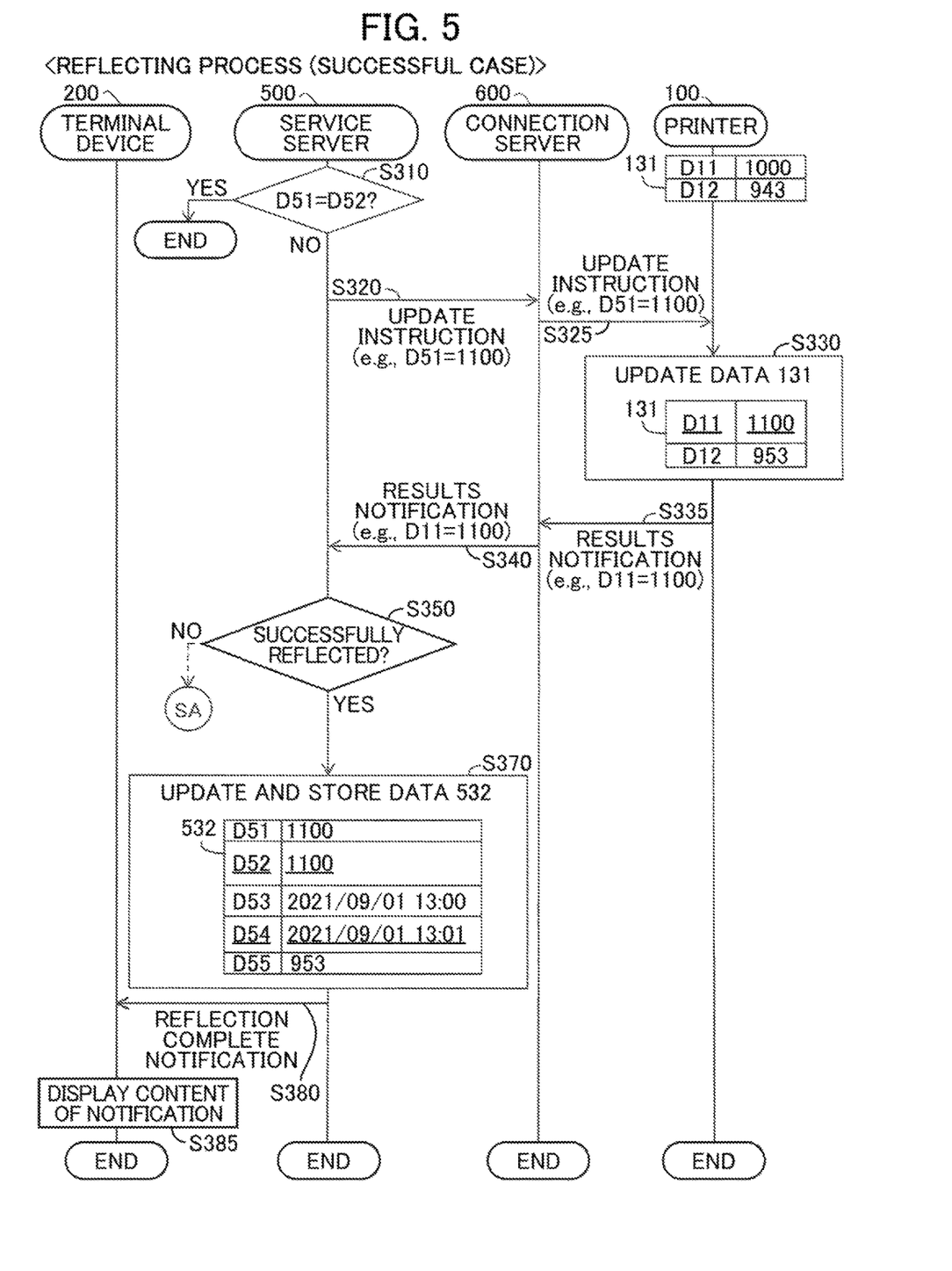
FIGS. 5 and 6 are sequence charts illustrating examples of a reflecting process.
Figure 6:
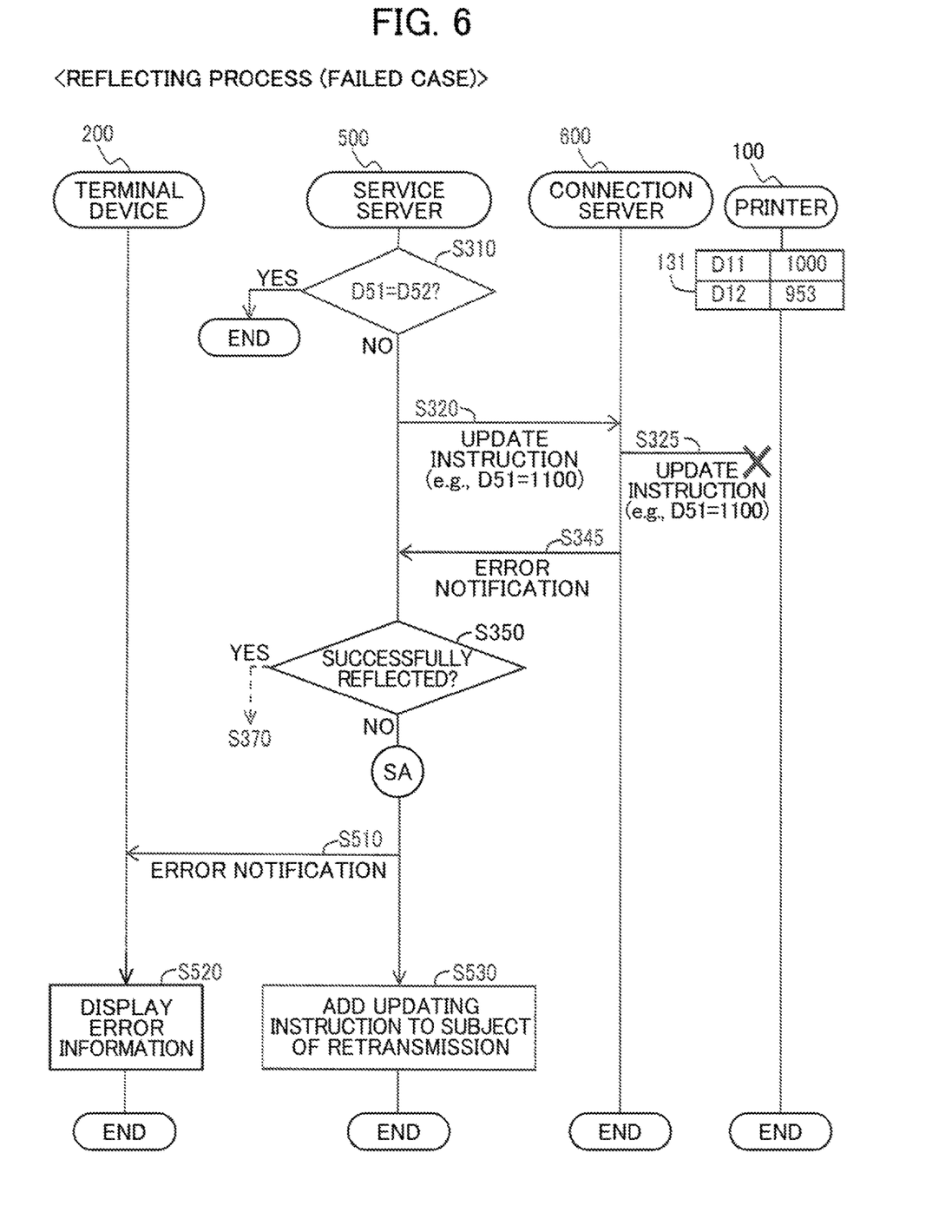

FIGS. 5 and 6 are sequence charts showing examples of a reflecting process for reflecting the cumulative purchased sheet count on the printer 100 after the sheet count was updated on the service server 500.

Successful Reflection

First, a reflecting process that results in successfully reflecting the cumulative purchased sheet count will be described with reference to FIG. 5. The top portion of FIG. 5 shows an example of the control data 131 in the printer 100 prior to being updated. Here, D11=1000.

In S310 the processor 510 of the service server 500 references the service data 532 shown in FIG. 2C. As described with reference to FIG. 2C, the service data 532 shows a plurality of datasets DS for a plurality of printer identifiers PID. The process in the example of FIG. 5 is performed for one printer identifier PID, and specifically the printer identifier PID for the printer 100. While not shown in the sequence chart, the processor 510 identifies printers one by one based on the plurality of printer identifiers PID and repeats the process in FIG. 5 for each printer.

While referencing the service data 532 in S310, the processor 510 determines whether the cumulative purchased count D51 has the same value as the reflected cumulative purchased count D52. When D51=D52 (S310: YES), the processor 510 assumes that the cumulative purchased sheet count D51 has been reflected on the printer 100 side and ends the reflecting process of FIG. 5. The processor 510 may also determine whether the cumulative purchased sheet count has been reflected on the printer 100 side by determining whether the time indicated by the additional purchase reflected timestamp D54 is later than the time indicated by the additional purchase timestamp D53 rather than determining whether the cumulative purchased count D51 is equal to the reflected cumulative purchased count D52. The process of S310 executed in a process shown in the sequence chart of FIG. 7 (described later) is an example of the reflecting determination process. Here, in the specification, the expressions such as "the printer 100 reflects the cumulative purchased sheet account D51" and "the cumulative purchased sheet count D51 is reflected on the printer 100" may indicate a situation that status or data (the cumulative purchased count D11) of the printer 100 is changed in response to (in a manner depending on) the current (or currently updated) cumulative purchased sheet count D51 in the service server 500, that is, a situation that the cumulative purchased sheet count D51 is reflected in the status or data (the cumulative purchased count D11) in the printer 100.

When the cumulative purchased sheet count updated on the service server 500 has not yet been reflected on the printer 100 side, i.e., when the cumulative purchased count D51 differs from the reflected cumulative purchased count D52 in this example (S310: NO), in S320 the processor 510 transmits to the connection server 600 an updating instruction addressed to the printer 100. The updating instruction includes data specifying the cumulative purchased count D51, and data specifying the printer identifier PID of the destination printer 100. The following description assumes that D51=1100.

In S325 the processor 610 of the connection server 600 relays the updating instruction received from the service server 500 to the printer 100. The connection data 631 stored on the connection server 600 indicates correlations between printer identifiers PID and information such as IP addresses indicating the network locations of printers connected to the connection server 600 through persistent connections. The processor 610 references the connection data 631 to find the printer associated with the printer identifier PID specified in the updating instruction and transmits the updating instruction to that printer. The processes of S320 and S325 executed in the process shown in FIG. 7 (described later) are an example of the instruction transmitting process.

In S330 the processor 110 of the printer 100 updates the cumulative purchased count D11 in the control data 131 to the same value as the cumulative purchased count D51 specified in the updating instruction. In this case, the cumulative purchased count D11 is updated from 1000 to 1100.

In S335 the processor 110 transmits an updating results notification addressed to the service server 500 to the connection server 600. The updating results notification includes data indicating the updated cumulative purchased count D11. Hereinafter, the updating results notification will simply be called a results notification. In S340 the processor 610 of the connection server 600 relays the results notification received from the printer 100 to the service server 500. The results notification transmitted in S335 and S340 which are executed in the process shown in FIG. 7 (described later) is an example of the reflecting completion notification.

In S350 the processor 510 of the service server 500 determines whether the cumulative purchased count D51 was successfully reflected in the control data 131 stored on the printer 100. In the present embodiment, the processor 510 determines that successful reflection occurred when the service server 500 receives the results notification from the printer 100. The process performed in cases that reflection is determined to be unsuccessful will be described later.

When the processor 510 determines that reflection was successful (S350: YES), in S370 the processor 510 updates the reflected cumulative purchased count D52 to the same value as the cumulative purchased count D11 indicated in the results notification. In the example of FIG. 5, the cumulative purchased count D11 is 1100. Thus, the reflected cumulative purchased count D52 is updated to 1100 in this case. The processor 510 also updates the additional purchase reflected timestamp D54 to the current date and time. The processor 510 stores each updated data in the service data 532.

In S380 the processor 510 transmits a reflection complete notification to the terminal device 200. The process of S380 executed in the process shown in FIG. 7 (described later) is an example of the notification transmitting process. In S385 the processor 210 of the terminal device 200 displays the content of the reflection complete notification received in S380 on the display 240. Subsequently, the reflecting process of FIG. 5 ends.

The processor 510 of the service server 500 initiates the reflecting process after completing the process in S220 of the purchasing process described in FIG. 4 or after completing the process in S430 of a reconnecting process shown in FIG. 7 described later. In this way, the processor 510 can sync the cumulative purchased count D11 stored on the printer 100 with an updated cumulative purchased count D51 to reflect an increase in the cumulative purchased count D51 resulting from a purchasing process in the cumulative purchased count D11. The processor 510 performs a similar reflecting process for the other printers.

Failed Reflection

Next, a reflecting process for cases in which the cumulative purchased sheet count failed to be reflected on the printer 100 side will be described with reference to FIG. 6. Reflection of the cumulative purchased count D51 may fail due to any of various reasons. For example, the cumulative purchased count D11 will not be updated on the printer 100 in a case that the power for the printer 100 is off and thus the printer 100 and the connection server 600 are in a disconnected state (or the printer 100 is in offline state) at this time. Further, the printer 100 cannot receive updating an instruction in a case that a failure occurs to the network connecting the printer 100 to the connection server 600 and thus the printer 100 and connection server 600 are in the disconnected state (or the printer 100 is in offline state). Steps S310, and S320 in FIG. 6 are identical to the corresponding step numbers in FIG. 5. In S325 the connection server 600 try to send the update instruction toward the printer 100. However, in S325 of FIG. 6, it is assumed that the printer 100 cannot receive the updating instruction from the connection server 600.

Consequently, the processor 610 of the connection server 600 does not receive a results notification from the printer 100 after the processor 610 has transmitted the updating instruction in S325. In such cases, the processor 610 may update the online flag in the connection data 631 stored in the nonvolatile storage 630 to "0" for the printer identifier PID identifying the printer 100. In S345 the processor 610 transmits an error notification to the service server 500. The condition for transmitting the error notification in S345 may be any of various error transmission conditions indicating that the printer 100 did not receive the updating instruction. One example of the error transmission condition is that the connection server 600 has received no results notification from the printer 100 until a prescribed first wait time period has elapsed after the connection server 600 transmitted the updating instruction.

In S350 the processor 510 of the service server 500 determines whether the cumulative purchased count D51 was reflected successfully. Here, the processor 510 determines that reflection was not successful when the service server 500 received the error notification from the connection server 600. In the present embodiment, the connection server 600 transmits either one of the results notification received from the printer (S340 of FIG. 5) and the error notification (S345 of FIG. 6) to the service server 500. Therefore, the condition for determining whether the cumulative purchased count D51 was successfully reflected is equivalent to the service server 500 not receiving the results notification from the printer 100.

Note that the processor 510 may determine that reflection was not successful in a case that the results notification was not received from the printer 100 until a prescribed second wait time period has elapsed after the processor 510 transmitted the updating instruction in S320. In other words, the processor may determine that the reflection was successful in a case that the results notification was received from the printer 100 until the prescribed wait time period has elapsed. The condition of the service server 500 not receiving a results notification from the printer 100 is an example of the condition indicating that the printer 100 did not receive the updating instruction.

When the processor 510 determines that reflection was not successful (S350: NO), in S510 the processor 510 transmits an error notification to the terminal device 200. In S520 the processor 210 of the terminal device 200 displays error information specifying the error on the display 240 on the basis the error notification. Error information may include a message indicating that the cumulative purchased count D11 stored on the printer 100 was not updated. After viewing the error information, the user may take steps to resolve the error. As a specific example, the user may switch on the power to the printer 100, or restart a network device to which the printer 100 is connected.

The error notification transmitted in S510 may include various information such as the cause of the error, the cumulative purchased count D51, and the reflected cumulative purchased count D52. In S520 the processor 210 may display all or a part of the information specified by the data in the error notification on the display 240.

After completing the process of S510, in S530 the processor 510 of the service server 500 adds an updating instruction to a subject of retransmission. For example, the processor 510 stores updating instruction data specifying the updating instruction to be retransmitted in the storage 515 (e.g., the nonvolatile storage 530). The updating instruction data may include data specifying the cumulative purchased count D51 and data specifying the printer identifier PID of the destination printer. Subsequently, the processor 510 ends the reflecting process.

In the present embodiment, the processor 510 can perform the reflecting process in FIG. 5 or FIG. 6 for each of the plurality of printer identifiers PID. Therefore, a plurality of updating instructions for a plurality of printers may be set as a subject of retransmission. The updating instruction in the subject of retransmission is retransmitted in a retransmitting process described next.

Retransmitting Process

Although not illustrated in the drawings, the processor 510 of the service server 500 executes a retransmitting process to retransmit updating instructions to printers when such updating instructions were added as a subject of retransmission in S530 of FIG. 6. Note that it is not absolutely necessary to execute the process in S530 or the retransmitting process described above since a reflecting process the same as the reflecting process shown in FIG. 5 is executed in a process of the present embodiment described later with reference to FIG. 7 and consequently the updating instruction are retransmitted to the printer 100 at this time (S320, S325).

Key Part of the Embodiment

Among the basic configurations and operations described above, the key part of this embodiment is the process performed after the printer 100 and the connection server 600 becomes in the disconnected state, as described above.

That is, in the printing management system 1000 described above, the connection server 600 is connected to the printer 100 via the communication interface 680 and the network NT. In this state, in a case that the service server 500 receives an addition request from the terminal device 200 to add printable sheets to the cumulative purchased count D51 on the service server 500, i.e., in a case that the user has purchased additional printable sheets (S210 of FIG. 4), in S220 the service server 500 adds the purchased sheet count to the cumulative purchased count D51 and stores the new cumulative purchased count D51 in association with the printer 100.

As mentioned earlier, the persistent connection, which had been established between the connection server 600 and the printer 100 as described above, may be abruptly interrupted for some reason. To handle such situations, a prescribed reconnecting process is performed on the printing management system 1000 in this embodiment. Next, this reconnecting process will be described in detail with reference to the sequence chart in FIG. 7.

Figure 7:
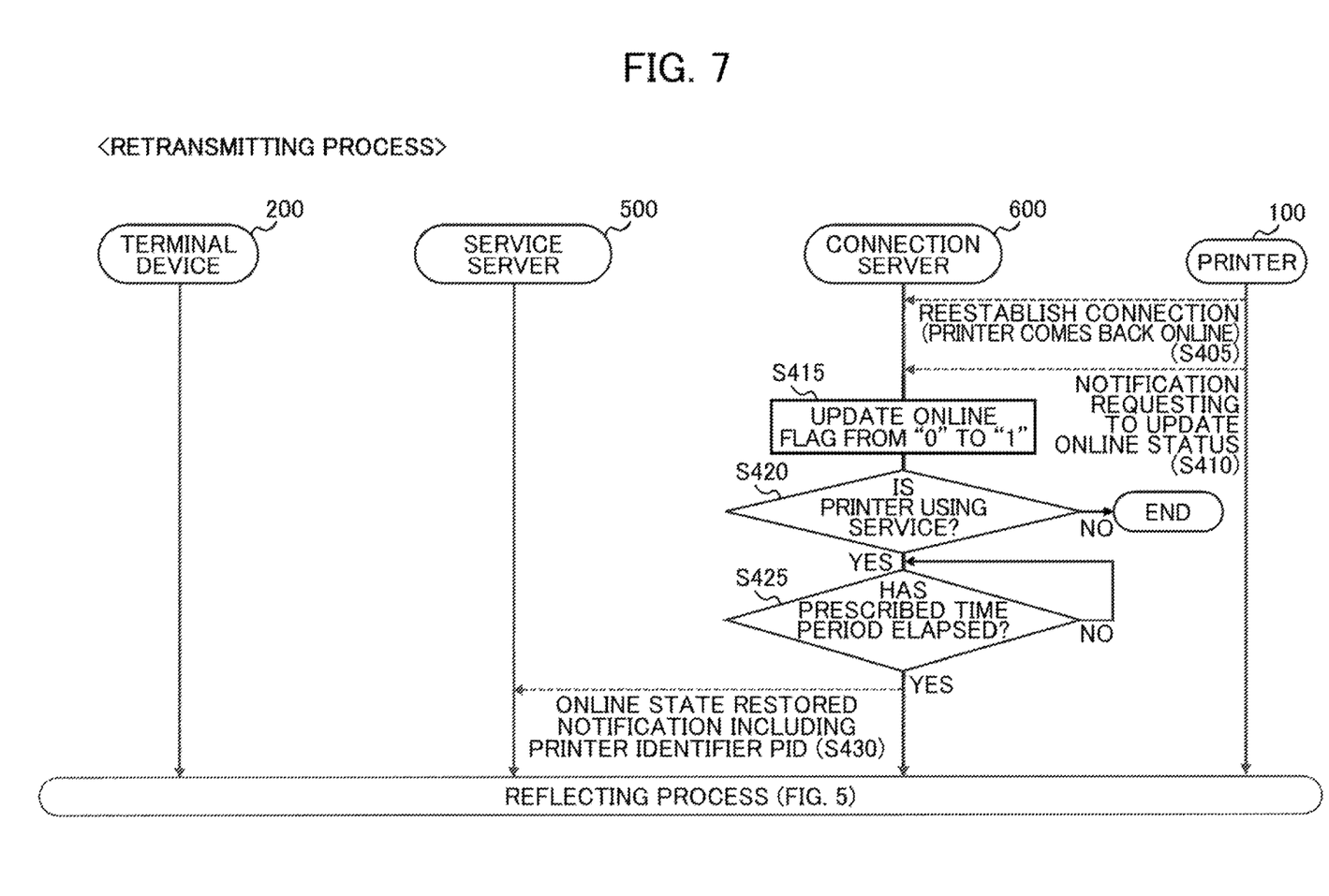
FIG. 7 is a sequence chart illustrating a reconnecting process.

The process in FIG. 7 is executed while the connection server 600 and the printer 100 are in the disconnected state as described above. In S405 at the beginning of the process, the printer 100 reestablishes a connection to the connection server 600 according to the method described above. Note that prior to this connection being reestablished while the connection server 600 and the printer 100 are still in the disconnected state, the connection server 600 identifies this disconnected state and sets the online flag to "0" in the connection data 631 stored in the nonvolatile storage 630.

After reestablishing the connection, in S410 the printer 100 transmits a notification to the connection server 600 requesting the connection server 600 to update the online status. Specifically, the printer 100 transmits a notification requesting that the connection server 600 change the value for the online flag from "0" to "1". This notification is an example of the instruction to update the status indicator or to change the value of the status indicator.

Based on the notification received in S410, in S415 the processor 610 of the connection server 600 identifies that the printer 100 and the connection server 600 have been reconnected and updates the online flag associated with the printer identifier PID for the printer 100 from "0" to "1" in the connection data 631 stored in the nonvolatile storage 630. The process of S415 is an example of the reconnection determining process.

In S420 the processor 610 of the connection server 600 determines whether the reconnected printer 100 is using a service provided by the service server 500. In this example, the processor 610 determines whether the printer 100 is using the printing service described above (determines whether the printer 100 is in a state in which the printer 100 can currently can receive (or, is illegible for) the printing service). Here, the nonvolatile storage 630 of the connection server 600 may store printer identifiers PID in association with information indicating whether the printing service is being used, for example, and the processor 610 may determine whether the printer 100 is using the printing service based on this information. The server 600 may store the information indicating that the printing service is being used for the printer 100 when the user subscribes for the printing service for the printer 100. The process of S420 is an example of the usage determining process. When the processor 610 determines that the reconnected printer 100 is not using a service provided by the service server 500 (S420: NO), the processor 610 ends the process in FIG. 7. However, when the printer 100 is using a service provided by the service server 500 (S420: YES), the processor 610 advances to S425.

In S425 the processor 610 determines whether a preset prescribed time period has elapsed after the printer 100 and the connection server 600 were reconnected and the online flag was updated from "0" to "1". In other words, the processor 610 determines in S425 whether the reconnected state has continued for the prescribed time period, indicating that the connection has stabilized. The process of S25 is an example of the continuation determining process.

When the prescribed time period has elapsed (S425: YES), in S430 the connection server 600 transmits an online state restored notification that includes the above-mentioned printer identifier PID to the service server 500.

After the connection server 600 completes the process in S430 described above, the process same as the reflecting process described in FIG. 5 or FIG. 6 is executed by the printer 100, connection server 600, service server 500, and terminal device 200.

In this case, the processor 510 of the service server 500 identifies the printer 100 based on the printer identifier PID included in the online state restored notification and, as described above in S310, determines whether the cumulative purchased count D51 is identical to the reflected cumulative purchased count D52 in the dataset DS that contains the printer identifier PID identifying the printer 100. Next, the servers 500 and 600 transmit an updating instruction in S320 and S325 for updating the cumulative purchased count D11 on the printer 100. In response, in S330 the processor 110 updates the cumulative purchased count D11 to the same value as the cumulative purchased count D51 indicated in the updating instruction. Subsequently, in S335 the printer 100 transmits the update results notification to the connection server 600 (or toward the service server 500) indicating that the printer 100 determined the update was successfully completed and in S340 the connection server 600 transmits the update results notification to the service server 300. In S370 the processor 510 updates the reflected cumulative purchased count D52 stored on the service server 500 to the same value as the cumulative purchased count D11. Subsequently, in S380 the service server 500 transmits a reflection complete notification to the terminal device 200, and the terminal device 200 displays details of this notification in S385. After completing S380, the service server 500 may delete the updating instruction for the printer identifier PID of the printer 100 from the subject of retransmission.

Effects of the Embodiment

In the embodiment described above, a server system configured of the service server 500 and the connection server 600 is connected to the terminal device 200 and the printer 100 via the communication interfaces 580 and 680. When the service server 500 receives the addition request to add printable sheets to the cumulative purchased count D51 for the printer 100, the service server 500 executes the process in S220 (FIG. 4) to store the new cumulative purchased count D51 incremented by the requested number of printable sheets in the nonvolatile storage 530 so that the new cumulative purchased count D51 is in association with the printer 100.

When the communication connection to the printer 100 established via the communication interfaces 580 and 680 is interrupted, the connection server 600 in this embodiment determines whether a connection was reestablished with the printer 100 in S415 (FIG. 7). When the printer 100 has been reconnected, in S310 (FIG. 5), which is executed at the end of the process in FIG. 7, the processor 510 determines whether the cumulative purchased count D51 stored in the nonvolatile storage 530 in association with the printer 100 as described above has been reflected on the printer 100. When the cumulative purchased count D51 has not been reflected on the printer 100, in S320 and S325 the servers 500 and 600 transmit the instruction to the printer 100 for reflecting the new cumulative purchased count D51 on the printer 100.

Hence, when the cumulative purchased count D51 has been updated on the service server 500 side but not yet reflected on the printer 100 side, this update can be promptly reflected on the printer 100 in the present embodiment when the printer 100 is reconnected to the servers 500 and 600.

While the embodiment describes an example in which the server system is configured of two servers 500 and 600, the server system may be configured of a single server provided with the functions of the servers 500 and 600 or may be configured of three or more servers suitably sharing the functions of the servers 500 and 600.

Another feature of this embodiment is that, when the printer 100 was disconnected and subsequently reconnected to the servers 500 and 600 via the communication interfaces 580 and 680, in S425 (FIG. 7) the processor 610 determines whether the connected state following reconnection has been continuous for a prescribed time. When the connected state has been continuous for the prescribed time, the servers 500 and 600 transmit the instruction to the printer 100 for reflecting the cumulative purchased count D51 on the printer 100. Accordingly, the servers 500 and 600 only notify the printer 100 of the new cumulative purchased count D51 to be reflected on the printer 100 side once the connection reestablished between the connection server 600 and printer 100 is considered stable, thereby reducing the possibility of a reflection failure occurring when attempting to reflect the cumulative purchased count D51 on the printer 100.

Another feature of the present embodiment is that after the printer 100 reflects the cumulative purchased count D51 in response to the reflecting instruction received from the servers 500 and 600 as described above, the results notification indicating the results of this reflection is transmitted from the printer 100 in S335 and S340 (FIG. 5). Upon receiving the results notification in S340, in S380 the service server 500 transmits the completion notification to the terminal device 200 via the communication interfaces 580 and 680.

By notifying the terminal device 200 of reflection results on the printer 100 in response to a request from the terminal device 200 to add printable sheets to the cumulative purchased count D51, the user of the terminal device 200 in this embodiment can recognize that the cumulative purchased count D51 in the request has been reflected on the printer 100.

Another feature of the present embodiment is that the service server 500 stores two types of cumulative values related to the cumulative purchased count D51, i.e., the cumulative purchased count D51 incremented on the basis of the addition request acquired from the terminal device 200, and the reflected cumulative purchased count D52 representing the quantity that has been reflected on the printer 100. When the service server 500 receives an addition request from the terminal device 200 during normal operations in which the printer 100 is connected to and capable of communicating with the servers 500 and 600, the processor 510 increments the cumulative purchased count D51 accordingly, and subsequently increments the reflected cumulative purchased count D52 once the requested addition to the cumulative purchased count D51 has been reflected on the printer 100. According to the above process in the present embodiment, the processor 510 determines in S310 (FIG. 5) that the cumulative purchased count D51 has not yet been reflected on the printer 100 when the cumulative purchased count D51 and the reflected cumulative purchased count D52 stored in the nonvolatile storage 530 differ. Thus, the service server 500 in the present embodiment can smoothly and reliably determine whether the cumulative purchased count D51 has been reflected on the printer 100.

Another feature of the present embodiment is that an online flag is set on the connection server 600 to indicate whether the printer 100 is in a connected state or a disconnected state relative to the connection server 600. This online flag is maintained on the connection server 600. During a normal state when the printer 100 is connected to and communicating with the servers 500 and 600, the online flag F is set to "1", indicating a connected state. When communication between the printer 100 and the servers 500 and 600 is disconnected, the online flag F is set to "0", indicating a disconnected state.

According to the method of the present embodiment described above, a reconnected printer 100 transmits the update notification of the online status to the connection server 600 requesting the connection server 600 to switch the online flag F from "0" to "1". When the connection server 600 receives this notification, in S415 (FIG. 7) the processor 610 determines that the printer 100 has been reconnected. Thus, the connection server 600 in this embodiment can smoothly and reliably determine when a temporarily interrupted connection with the printer 100 has been reestablished.

Another feature of the present embodiment is that the server system is split between two servers: the connection server 600 and the service server 500. The service server 500 is responsible for providing the printer 100 with the aforementioned services related to the cumulative purchased count D51, and specifically for executing steps S310, S320, S350, S370 (FIG. 5), and the like described above. The connection server 600 is connected to a plurality of service provision servers providing a variety of services, such as the service server 500, and a plurality of printers to be managed, including the printer 100 that is the target of management in this embodiment. The connection server 600 is responsible for executing the processes in S415, S420 (FIG. 7), and the like described above. The printers that are connected to the connection server 600 include printers using services other than those provided by the service server 500, for example. For each printer, the connection server 600 can select one or more service provision servers to which the printer is connected to suit one or more services that the printer utilizes, for example.

In this embodiment, responsibilities are divided between the connection server 600, which is connected to a plurality of printers and functions as a central contact point for those printers, and the service server 500 that, by connecting to the connection server 600, can provide services to the printers related to cumulative purchased counts D51, as described above in the embodiment. Thus, the processing load on the printing management system 1000 of the present embodiment can be shared by having the connection server 600 perform processes related to the management of printers 100 and having the service server 500 perform service-related processes. Accordingly, the server load is better distributed than when a single server performs all processing.

Variations

While the disclosure has been described in detail with reference to the specific embodiment thereof, it would be apparent to those skilled in the art that various changes and modifications may be made therein without departing from the scope of the invention.

The service server 500 may execute various processes that are not limited to the processes described above. For example, the processor 510 may store data in the storage 515 (e.g., the nonvolatile storage 530) representing any of various information on the number of sheets the printer 100 can print and is not limited to storing the combination of parameters D51, D52, and D55 shown in FIG. 2C.

For example, each time the purchasing process shown in FIG. 4 is executed, the processor 510 may store data indicating the purchased sheet count in the storage 515. Then once the purchased sheet count has been reflected in the cumulative purchased count D11, for example, the processor 510 may delete the data on the purchased sheet count from the storage 515. In this case, the processor 510 may determine, on the basis of the data on the purchased sheet count, whether the cumulative purchased sheet count D51 has been reflected on the printer 100 in S310 (FIG. 5). That is, the processor may determine the cumulative purchased sheet count D51 is not reflected on the printer 100 in S310 when the processor 510 determines that the storage 515 stores the purchased sheet count. In this case, the service server 500 may store the cumulative purchased sheet count D51 and the cumulative print count D55 but not store the reflected cumulative purchased count D52. The processor 510 may also store a combination of data in the storage 515 that includes flag data indicating whether the purchased sheet count has been reflected on the corresponding printer 100, and data specifying the purchased sheet count. Then, once the purchased sheet count has been reflected in the cumulative purchased count D11 stored on the printer 100, the processor 510 may switch the value of the flag for the purchased sheet count from "not reflected" to "reflected." This flag data may be used when determination of S310 is made. In this case, the service server 500 may store the cumulative purchased sheet count D51 and the cumulative print count D55 but not store the reflected cumulative purchased count D52.

The printer 100 may execute any of various processes that are not limited to the processes described above. In the reflecting process of FIG. 5 according to the present embodiment, for example, the processor 110 of the printer 100 transmits the update results notification to the connection server 600 in response to updating instruction. As an alternative, the processor 110 may transmit the update results notification addressed to the service server 500 separately from a response to the updating instruction.

The update results notification transmitted by the printer 100 may include data related to the updated number of printable sheets, such as the updated cumulative purchased count D11. However, the update results notification may simply indicate that the update has been completed without including data related to the number of updated printable sheets. Data related to the updated number of printable sheets may be any of various data that can be used to calculate the number of updated printable sheets, such as the updated cumulative purchased count D11 or the cumulative print count D12.

Further, the data that the processor 110 stores in the nonvolatile storage 130 may be any of various information indicating the number of sheets that the printer 100 can print and is not limited to a combination of the parameters D11 and D12 shown in FIG. 2A. For example, rather than the combination of the parameters D11 and D12, the processor 110 may store other control data in the storage 115 that indicates the number of printable sheets together with the cumulative printed sheet count D12. The processor 110 then may update this control data in response to an updating instruction received from the service server 500.

In the embodiment described above, the service server 500 manages the printer 100 using the number of printable sheets as an example of the usable quantity (usable print quantity) on the printer. When the printer 100 executes single-sided printing, the number of printable sheets is equivalent to the number of printable pages. When the printer executes duplex printing, the number of printable sheets is half the number of printable pages. Rather than the number of printable sheets, the service server 500 may use other types of usable quantities to manage the printers. For example, the usable quantity may specify any parameter that is modified when images are printed, such as the number of printable pages and the amount of available colorant such as ink or toner, or the usable quantity may include the combination of these parameters. In any case, the purchasing process of FIG. 4 may be any of various processes for incrementing the usable quantity, and the printer 100 allows printing only within the range of this usable quantity.

A plurality of printers, i.e., a plurality of printer identifiers PID, may be associated with a single user identifier UID shown in FIG. 2B. A printer may also be managed using a physical device specifying the actual printer, and a logical device associated with the physical device.

For example, printer identifiers PID associated with user identifiers UID in the user data 531 shown in FIG. 2B may be identifiers for logical devices, and identifiers of physical devices may be associated with these logical identifiers. A usable quantity, such as the number of printable sheets, may be assigned to each logical device. When a printer is replaced due to a malfunction or other reason, only the identifier for the physical device associated with the logical device is modified while the logical device remains unchanged. The usable quantity assigned to the logical device is then passed on to the new printer.

In the embodiment described above, the service server 500 acquires the addition request to increment a usable quantity for a printer and transmits the updating instruction addressed to the printer. The server system that executes these processes may have various other configurations instead of the configuration of the service server 500 described in the embodiment. For example, the service server 500 may establish a persistent connection with the printer rather than the connection server 600. In this case, the connection server 600 may be eliminated. Further, a plurality of devices that can communicate over a network (e.g., computers) may each implement some of the functions for the processes performed by the server system so that the devices as a whole can provide the functions of the server system. In this case, the system comprising these devices configures the server system.

Part of the configuration implemented in hardware in the embodiment described above may be replaced by software and, conversely, all or part of the configuration implemented in software may be replaced by hardware. For example, the function or process of S220 in FIG. 4 may be implemented by a dedicated hardware circuit, such an application specific integrated circuit (ASIC).

When all or part of the functions in the present disclosure are implemented by computer programs, the programs can be stored on a computer-readable storage medium (a nontemporary storage medium, for example). The programs may be used from the same storage medium on which they are provided, or may be first loaded onto a different storage medium. The "computer-readable storage medium" may be a portable medium, such as a memory card or CD-ROM; an internal storage device built into the computer, such as any of various ROM; or an external storage device, such as a hard disk drive connected to the computer.

Further, the sequence charts in FIGS. 3-7 do not limit the present invention to the steps indicated therein. Steps may be added or deleted, or their order may be rearranged.

The configurations, processes, steps, methods in the above embodiment and its variations may be combined arbitrarily.

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents.

What is claimed is:

1. A server system comprising:
   a communication interface connectable to an external device and a printer;
   a storage; and
   at least one processor configured to perform:
      storing in the storage a usable print quantity in association with the printer in response to an increase request from the external device via the communication interface, the increase request being a request to store an increased quantity as the usable print quantity, the usable print quantity indicating one of the number of sheets and an amount of colorant which are usable for printing in the printer;
      determining, after the communication interface is disconnected from the printer, whether a reconnection is established between the communication interface and the printer;
      determining, when the reconnection is determined to be established, whether the usable print quantity stored in association with the printer has been reflected in data related to a usable quantity stored in the printer; and
      sending to the printer, when the usable print quantity is determined not to have been reflected in any data in the printer, a reflecting instruction to reflect the usable print quantity in the data related to the usable quantity stored in the printer.

2. The server system according to claim 1, wherein the at least one processor is configured to further perform:
   transferring, in response to receiving a reflection completion notification which is transmitted from the printer as a response to the reflecting instruction, the reflection completion notification to the external device.

3. The server system according to claim 1, wherein the storing includes:
   obtaining the usable print quantity on the basis of the increase request,
   wherein the storage stores a second usable print quantity that has been reflected in the data related to the usable quantity stored in the printer,
   wherein the at least one processor determines that the usable print quantity has not been reflected in the data related to the usable quantity stored in the printer when the usable print quantity is not equal to the second usable print quantity.

4. The server system according to claim 3, wherein the at least one processor is configured to further perform:
   updating, in response to receiving a reflection completion notification which is transmitted from the printer as a response to the reflecting instruction, the second usable print quantity so that the second usable print quantity is equal to the usable print quantity.

5. The server system according to claim 1, wherein the at least one processor is configured to further perform:
   setting a status indicator indicating whether the communication interface is connected to or disconnected from the printer,
   wherein the at least one processor determines that the reconnection is established when the at least one processor receives an instruction to update the status indicator from the printer.

6. The server system according to claim 1, further comprising:
   a first server connectable to the printer; and
   a second server connectable to the first server and configured to provide the printer with a service,
   wherein the at least one processor includes a first-server processor provided in the first server and a second-server processor provided in the second server,
   wherein the first-server processor is configured to perform:
      the determining whether the reconnection is established;
      determining, when the reconnection is determined to be established, whether the printer is in a receivable state in which the printer can receive the service related to the usable quantity stored in the printer; and
      sending to the second server, when the printer is determined to be in the receivable state, identification information of the printer and notification information indicating that the reconnection is established,
   wherein the second-server processor is configured to perform:
      identifying, when the second-server processor receives the identification information and the notification information from the first server, the printer identified by the identification information,
      wherein after the identifying, the second-server processor performs the determining whether the usable print quantity has been reflected in the data related to the usable quantity stored in the identified printer identified in the identifying,
      wherein the second-server processor performs the sending the reflecting instruction to the printer identified in the identifying when the usable print quantity is determined not to have been reflected in any data in the printer identified in the identifying.

7. A non-transitory computer readable storage medium storing a set of program instructions installed on and executed by at least one processor included in a server system, the server system further including: a communication interface connectable to an external device and a printer; and a storage, the set of program instructions when executed by the at least one processor causing the server system to perform:

storing in the storage a usable print quantity in association with the printer in response to an increase request from the external device via the communication interface, the increase request being a request to store an increased quantity as the usable print quantity, the usable print quantity indicating one of the number of sheets and an amount of colorant which are usable for printing in the printer;

determining, after the communication interface is disconnected from the printer, whether a reconnection is established between the communication interface and the printer;

determining, when the reconnection is determined to be established, whether the usable print quantity stored in association with the printer has been reflected in data related to a usable quantity stored in the printer; and sending to the printer, when the usable print quantity is determined not to have been reflected in any data in the printer, a reflecting instruction to reflect the usable print quantity in the data related to the usable quantity stored in the printer.

8. The server system according to claim 1, wherein the storing includes:

obtaining the usable print quantity on the basis of the increase request, wherein the storage stores a second usable print quantity, wherein the at least one processor determines that the usable print quantity has not been reflected in the data related to the usable quantity stored in the printer when the usable print quantity is not equal to the second usable print quantity.

9. The server system according to claim 8, wherein the at least one processor is configured to further perform:

updating, in response to receiving a reflection completion notification which is transmitted from the printer as a response to the reflecting instruction, the second usable print quantity so that the second usable print quantity is equal to the usable print quantity.

10. A server system comprising:

a communication interface connectable to an external device and a printer;

a storage; and at least one processor configured to perform:

updating a first usable print quantity stored in the storage on the basis of an increase request received from the external device via the communication interface, the first usable print quantity being in association with the printer, the increase request being a request to increase the first usable print quantity, the first usable print quantity indicating one of the number of sheets and an amount of colorant which are usable for printing in the printer;

determining, after the communication interface is disconnected from the printer, whether a reconnection is established between the communication interface and the printer;

determining, when the reconnection is determined to be established, whether the first usable print quantity is equal to a second usable print quantity stored in the storage to determine whether the first usable print quantity stored in association with the printer has been reflected in data related to a usable quantity stored in the printer, the second usable print quantity being defined as a variable that can be varied depending on information from the printer;

sending to the printer, when the first usable print quantity is not equal to the second usable print quantity, a reflecting instruction to reflect the first usable print quantity in the data related to the usable quantity stored in the printer; and updating, after a reflection completion notification is received from the printer as a response to the reflecting instruction, the second usable print quantity so that the second usable print quantity becomes equal to the first usable print quantity.

* * * * *